United States Patent [19]
Mayhew

[11] 3,741,569
[45] June 26, 1973

[54] OIL CONTROL PISTON RING
[75] Inventor: Donald J. Mayhew, St. Louis, Mo.
[73] Assignee: Ramsey Corporation, St. Louis, Mo.
[22] Filed: May 27, 1971
[21] Appl. No.: 147,423

[52] U.S. Cl. ............................... 277/140, 277/200
[51] Int. Cl. ............................................... F16j 9/00
[58] Field of Search.................. 277/138, 139, 140, 277/200, 201; 267/1.5

[56] References Cited
UNITED STATES PATENTS
3,442,519    5/1969    Hamm et al. ...................... 277/140
3,371,938    3/1968    Hamm et al. ...................... 277/200

Primary Examiner—George E. Lowrance
Assistant Examiner—Robert I. Smith
Attorney—Hill, Sherman, Meroni, Gross & Simpson

[57] ABSTRACT

A one or two-piece piston ring for oil control purposes, the ring being circumferentially expansive and having a plurality of axially centrally located U-shaped cross section legs connecting the axially top and bottom portions of the ring, the U-shaped cross section legs being alternatively connected to adjacent legs by circumferential bars at either the top or the bottom of the "U", the "U" opening inwardly, and the bars being dimensioned to provide the circumferential spring thrust for the ring independent of the cylinder contacting portions of the ring.

13 Claims, 7 Drawing Figures

PATENTED JUN 26 1973　　　　　　　　　　3,741,569
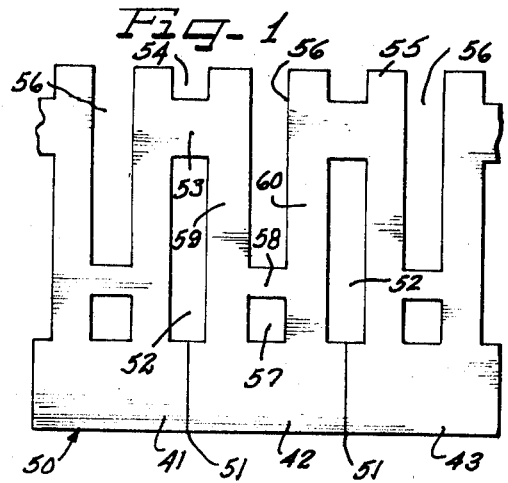
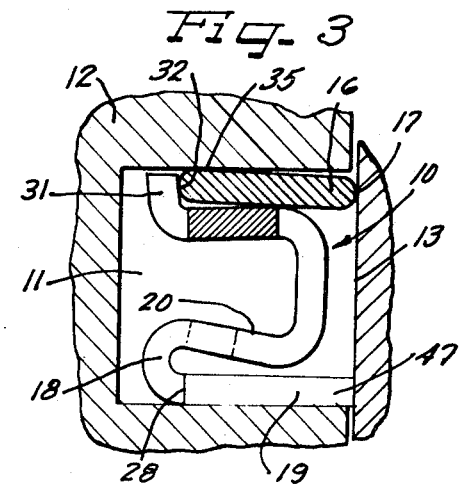
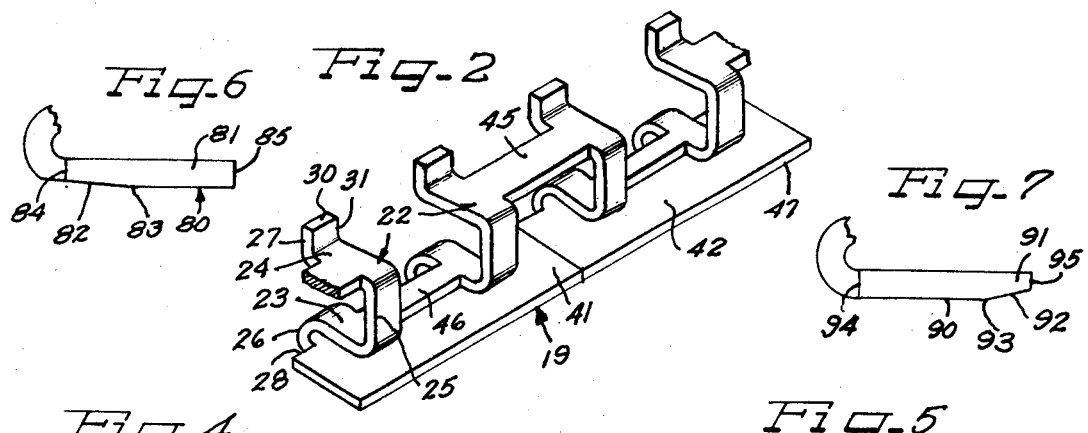
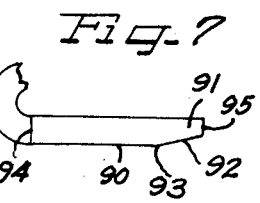
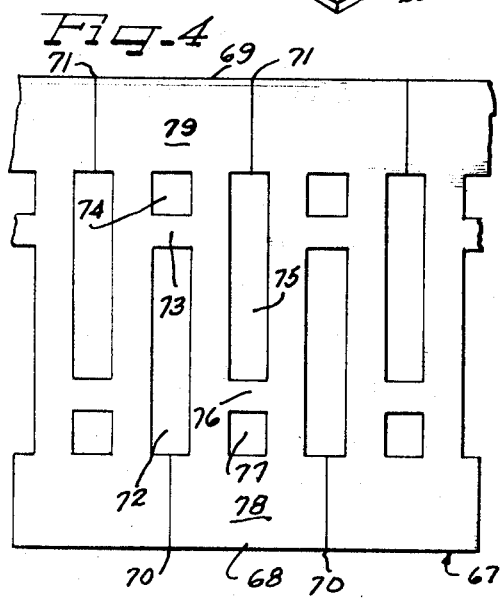
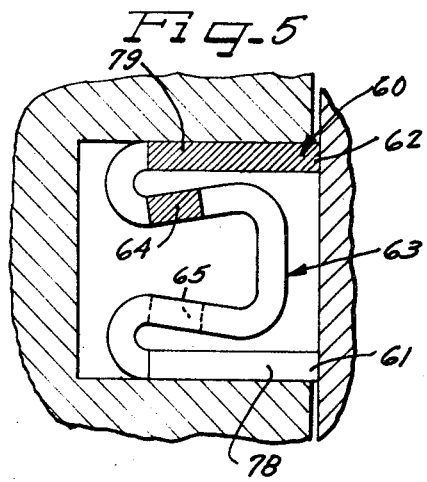
INVENTOR.
Donald J. Mayhew
BY　Hill, Sherman, Meroni, Gross & Simpson
　　　　　　　　　　　　　　　ATTORNEYS

OIL CONTROL PISTON RING

BACKGROUND OF THE INVENTION

1. Field of the Invention

This invention relates to piston rings and more particularly to a circumferentially expansible oil control ring.

2. Prior Art

Circumferentially expansible oil control rings are known to the art. Such rings may include a pair of axially spaced-apart rail rings with a circumferential expander-spacer therebetween. Alternatively, the ring may be one-piece having axially spaced-apart top and bottom segmented rails interconnected with an integral circumferential expansion portion.

A modification of this latter type has led to the development of a two-piece ring wherein one of the pieces is a rail ring and the other piece comprises a segmented rail with an integral expander spacer section, the rail ring resting atop the expander-spacer section and being urged outwardly therewith along with the segmented rail integrally attached to the expander-spacer section.

In the construction of this latter type of ring as well as the one-piece ring, it has been known to provide the expander-spacer section or the expander section by a reverse "U" bend of metal in between the rail ring sections. The reverse "U" portion is normally provided for through a series of circumferentially spaced-apart spring finger sections or legs, each of which is, in the two-piece embodiment, integral at one end with one of the rail segments and which then projects axially from that segment, then through a U-shaped cross section portion with the "U" overlying the segmented rail, thence from the other end of the "U" axially to provide tabs for urging the rail ring circumferentially from its inner diameter. Normally, in such rings, alternate fingers are interconnected at the leg of the "U" opposite the segmented rail end by interconnecting bands to hold the ring together. There are generally bands only at the end of the "U" which receives the solid rail ring.

In one-piece oil control rings having segmented rail sections at both axial ends, there are generally no interconnecting bands between the spring fingers. Alternate fingers are connected by staggering the segments of the bottom segmented rail in comparison with the top segmented rail whereby each segment of one of the segmented rails is connected with two fingers, each of which is connected at the other axial end of the finger with different segments of the other segmented rail.

In either of these prior art constructions, the circumferential expansion must then include a bending moment of the individual segments. Further, in the prior art two-piece arrangements, the expansion spring force was different for the integral segmented rail and the independent solid rail.

SUMMARY

The present invention overcomes disadvantages inherent in the prior art and provides for finger connecting bands on both the axial ends of the U-shaped cross section spring finger portion. The bands alternate from one axial end to the other axial end so that adjacent fingers are interconnected through only one band. In a two-piece ring embodiment, the bands adjacent the segmented integral rail are radially narrower than the bands at the other axial end of the U-shaped portion. This provides an equalization of the spring rate for both the segmented integral rail and the independent solid rail. The difference in radial thickness of the bands allows this equalization even though the spring fingers of necessity are connected through segments of the integral segmented ring and therefore the stiffness of the segments has some effect on the circumferential expansive spring force. The provision of the narrower band adjacent the integral segmented rail reduces the spring force generated by the segment itself, thereby eliminating circumferential curl of the segments and providing for complete face contact between the segments of the integral segmented rail and the cylinder in which the ring operates.

In the preferred two-piece embodiment, the circumferential bands are of equal radial width at both axial ends of the "U," thereby maintaining equal spring rates for both of the segmented rails while at the same time minimizing the deflection of the rails themselves by allowing the spring force to be generated through the circumferential bands.

In a modification of the preferred embodiment, the integral rail may be of reduced thickness adjacent the inner diameter or adjacent the outer diameter. In either of those embodiments, the contact area between the rail and the side wall of the groove is reduced, thereby minimizing friction while at the same time allowing a slight rocking movement of the rail to more fully utilize the circumferential expansive force and to aid in accommodating variances of movement between the ring and the groove in which it is received, such as are encountered during operation of the piston.

It is therefore an object of this invention to provide an improved oil control ring.

It is a further object of this invention to provide an improved two-piece oil control ring consisting of an independent rail ring and a combination circumferential expander and segmented integral rail ring wherein the spring rates acting against the integral segmented rail and the independent rail are equalized by the provision of circumferentially extending struts or bands.

It is yet another object of this invention to provide a two-piece oil control ring having a U-shaped cross section expander integral at one end with a segmented scraping rail, the U-shaped cross section portion formed of a plurality of circumferentially spaced-apart spring fingers alternately interconnected at opposed radially extending leg portions by circumferential bands, the bands closest to the segmented rail being narrower than the bands at the axially opposed leg of the "U."

It is yet another and specific object of this invention to provide a one-piece oil control ring having an inverted "U" axially intermediate segmented oil scraping rails, the "U" formed of circumferentially spaced apart spring fingers interconnected by circumferential bands alternately connecting opposed legs of the U-shaped fingers, the bands functioning to equalize the spring rate on the segmented rails while minimizing deflection of the segments.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a plan view of a strip of ring material for forming the segmented rail and expander portion of the two-piece oil control ring of this invention prior to bending of the stock.

FIG. 2 is a perspective view of a portion of the expander and integral segmented rail formed by bending the stock of FIG. 1.

FIG. 3 is a fragmentary cross-sectional view of the ring of FIGS. 1 and 2 in position in a ring groove in a piston received in a cylinder.

FIG. 4 is a view similar to FIG. 1 of a piece of unbent cut stock material for a one-piece ring according to this invention.

FIG. 5 is a view similar to FIG. 3, illustrating the one-piece oil control ring of this invention.

FIG. 6 is a fragmentary cross-sectional view of a modified segmented rail according to this invention.

FIG. 7 is a view similar to FIG. 6 illustrating another embodiment.

DESCRIPTION OF THE PREFERRED EMBODIMENTS

FIG. 3 illustrates the ring 10 of this invention received in a ring groove 11 in a piston 12, which in turn is received in a cylinder bore 13.

The ring 10 illustrated is a two-piece oil control ring which comprises a substantially flat split rail ring 16 having an outer diameter surface 17 urged into contact with the wall of the cylinder 13 and a combination segmented rail and expander-spacer portion 18. The portion 18 includes the segmented rail 19 and the expander-spacer portion 20. The expander-spacer portion 20, best illustrated in FIG. 2, consists of a plurality of circumferentially spaced-apart spring fingers 22. The fingers are substantially U-shaped, having axially spaced-apart legs 23 and 24 interconnected by an outer diameter bight portion 25. The free ends 26 and 27 of the legs 23 and 24 are turned axially outwardly. The end 26 of the leg 23 is turned axially outwardly and back through a hairpin bend and terminates integrally with the inner diameter 28 of the segmented rail 19. The end 27 of the leg 24 turns axially outwardly and terminates in a free end 30. The outward turned portion of the end 27 forms a tab 31 for contacting the inner diameter 32 of the rail 16. In the embodiment illustrated in FIGS. 2 and 3, the tab 31 is angled from the axis of the ring to provide an angled contact with the inner diameter of the rail to force the inner diameter of the rail axially outwardly, thereby causing it to contact and seal against the top wall 35 of the groove 11 in side sealing relation. It is to be understood that the tabs 31 of this invention could be angled from the axis in the opposite direction or could be parallel to the axis, thereby providing side sealing of the rail ring adjacent the outer diameter thereof in the first instance or providing for an undished rail ring in the second instance.

It is further to be understood that although the fingers or legs 22 are described as U-shaped, the legs 23, 24 are not necessarily parallel and may, for example, converge towards one another from the bight section as is illustrated in FIG. 3. It is further not necessary that the angles of conversion of the legs be identical.

The individual segments 41, 42, 43 of the segmented rail 19 are each connected to two adjacent fingers or legs 22 at their ends 26. Alternate adjacent legs are interconnected through a circumferential band 45 connecting the legs 24 which are axially spaced from the legs 23 which are connected to the segments. In this manner, the legs which are connected to individual segments are in turn each connected to one leg of the adjacent segment.

Thus, each section of the portion 18 of the ring consists of a segmented rail section and two spring fingers, each of the fingers formed into an inwardly opening "U" having outturned free ends one of which is integral through a hairpin bend to the rail segment, the fingers circumferentially spaced from one another. Each segment in turn is connected with the adjacent segment through a crossbar 45. If the ring were completed at this point and formed into ring shape, then circumferential expansion will be generated through the spring nature of the beams 45 and of the rail segments 41–43. In order to generate such spring force, the rail segments 41–43 must be bent or deflected in a circumferential manner. This deflection reduces the contact area between the outer diameter surface 47 of the segments and the wall of the cylinder 13. Further, because of the material thickness difference between the beams 45 and the segments 41–43, the spring force which urges the segments 41–43 and the rail 16 circumferentially outwardly, would be different, thereby providing a different contact force between the cylinder wall and the rail 16 and between the cylinder wall and the segmented rail 19.

In order to eliminate this, my invention provides a second set of circumferential beams 46 connecting the legs 23 of the spring fingers 22 of each of the segments 41–43. The provision of the beams 46 minimizes the deflection of the segments and provides separate spring systems for expansion of the rail 16 and of the segmented rail 19. The circumferential expansive force is then generated through both the beams 45 and the beams 46. Because of the segmented nature of the rail 19 and the presence of the material of the ring 19 integral with the spring fingers 22, the beam 46 is radially narrower than the beam 45. Thus, equal spring rates are provided for the rail 16 and for the segmented rail 19 and the deflection of the segments of the rail 19 is minimized.

Thus, each section of the oil ring of my invention consists of a segmented rail section 41, 42, 43 and two spring fingers 22, each of which is formed integrally at one end thereof with the segment, and each of which is then bent through a hairpin curve, then into a U-shaped cross section portion with the free end bent axially outwardly to form a rail engaging tab. The fingers of each section are connected to one another through a circumferential beam 46 connecting the radially extending legs 23 of the U-shaped cross section fingers axially nearest the segmented rail. Adjacent sections are then connected into ring form through circumferentially extending beams 45 extending between the radial legs 24 of the fingers axially remote from the rail segments. The beams 45 and 46 alternate with one another around the ring and the beams 46 are radially narrower than the beams 45 to equalize the spring rates between the segmented rail 19 and the split rail 16.

The ring of FIG. 2 is formed from blanked stock as illustrated in FIG. 1. The stock may initially be flat, continuous stock having a given width. During the blanking and cutting steps, along one side edge of the strip 50, a plurality of spaced apart slits 51 are provided extending transversely into the stock 50 a distance sufficient to form the segmented rail. The slits 51 terminate in rectangular slots 52 which are closed at their outer ends by unblanked portions 53 which correspond to the beams 45 when the stock is bent. Notches 54 on the other side of the unblanked portions 53 extend to the opposite side 55 of the stock material. Alternating with the slits 51 and slots and notches 52 and 54 and positioned in the centerpoint of the segments 41, 42, 43 formed between the slits 51 are deep notches 56 extending inwardly from the side 55 and terminating in unblanked portions 58. Slots 57 are provided between the unblanked portion 58 and the segments 41, 42, 43. The unblanked portion 58 then serves as the beam 46 when the stock is formed into the ring shape.

Transversely extending unblanked sections 59 and 60 are integral with each of the segments 41, 42, 43 formed by the slits and notches 52, 54 on one side and the slit and notch 57 and 56 on the other side, and, when bent, form the fingers 22.

FIGS. 4 and 5 illustrate a one-piece embodiment 60 wherein segmented rails 61 and 62 are provided axially spaced apart by a U-shaped expander portion 63 consisting of circumferentially spaced-apart raised fingers alternately interconnected by beams 64 and 65.

The single piece ring of FIG. 5 is formed from the blanked stock material 67 which has a given width and two side edges 68 and 69. The side edges 68 and 69 have staggered slits 70 and 71 forming the segments of the segmented rails. Each slit 70 from the side 68 communicates to a slot 72 which terminates in an unblanked portion 73. Another short slot 74 is blanked into the material on the other side of the unblanked portion 73. The slits 71 from the side 69 extend to a slot 75 which in turn terminates in an unblanked portion 76. On the other side of the unblanked portion 76 is a short slot 77. The slots 72 and 75 are of the same length and the slots 77 and 74 are of the same length as are the unblanked portions 75 and 73 thereby forming a symmetrical progression with the segments 78 between the slits 70 and the segment 79 between the slits 71 being of equal length and width and being staggered with respect to one another. After bending, the ring is formed into the configuration illustrated in FIG. 5, wherein the segments 78 and 79 form the segments of the segmented rails 61 and 62 and the unblanked portions transverse of the stock material form the fingers of the expander section 63 with the unblanked portion 73 forming the beam 64 and the unblanked portion 76 forming the beam 65.

In this embodiment, because both axial ends of the ring comprise segmented rails, the beams 64 and 65 are of equal width, thereby providing equal spring rates on the segmented rails. The alternating circumferentially extending beams 64 and 65 minimize the amount of deflection in the rail segments and together with the spring fingers, provide for the circumferential expansion force.

FIGS. 6 and 7 illustrate modifications of the two above embodiments wherein the segments of the segmented rails may be of differing axial thickness or keystoned.

In FIG. 6, the axially outside surface 80 of the rail segment 81 is keystoned or of reduced thickness adjacent its inner diameter as at 82. The keystoning may be planar, extending to a point 83 intermediate the inner diameter 84 and outer diameter 85.

FIG. 7 illustrates a separate embodiment wherein the axially outer surface 90 of the rail segment 91 is keystoned or of reduced thickness adjacent its outer diameter 95 as at 92. The reduced thickness portion is of variable thickness and may extend to a point 93 intermediate the inner diameter 94 and outer diameter 95.

In either embodiment, the keystoning reduces the surface area normally in contact with the side wall of the ring groove and may provide for a pivot point 83, 93 about which the ring segment may move during operation of the piston in which the ring is used. The keystoning aids in maintaining correct contact between the outer diameter of the ring and the cylinder wall while reducing frictional forces and aiding in sealing force.

It will therefore be seen from the above that my invention provides for a one or two-piece oil control ring having axially spaced-apart circumferential cylinder wall engaging scraping rings which are circumferentially urged by an expander portion integral with at least one of the rings, the expander portion consisting of circumferentially spaced-apart spring fingers formed into a substantially U-shaped cross-section with the "U" shape opening into the inner diameter of the ring, the "U" having axially spaced apart leg portions alternately interconnected by circumferentially extending beams, the beams minimizing deflection of the integral scraping ring.

I claim as my invention:

1. An oil control ring for use in internal combustion engines comprising: at least one circumferential segmented rail ring, a plurality of circumferentially spaced-apart axially upstanding spring fingers integral with the said rail ring at the inner diameter thereof, said fingers formed into substantially U-shaped cross section, the "U" open to the inner diameter of the ring, the "U" having substantially radially directed axially spaced-apart legs, the legs interconnected by an outer diameter substantially axially extending bight section, a plurality of circumferentially extending beams alternately connecting adjacent legs, and the beams being axially staggered around the circumference of the ring the beams spaced from and axially overlying the rail rings.

2. The ring of claim 1 wherein the fingers are integral with segments of the segmented rail ring at one end of the fingers, the other end of the fingers having an axially extending portion, an unsegmented split rail ring, said unsegmented rail ring positioned axially beyond the leg of the "U" remote from the segmented rail ring, the inner diameter of the unsegmented rail ring being contacted by portions of the axially outturned ends of the fingers and being circumferentially expanded thereby, the beams connecting the legs adjacent the segmented rail ring being radially narrower than the beams connecting the fingers adjacent the unsegmented rail ring.

3. A two-piece oil control ring for use in ring grooves in pistons in internal combustion engines comprising a circumferentially segmented, radially extending rail ring, each of said segments having associated therewith two axially upright circumferentially spaced-apart spring fingers, each of said fingers integral with the said segment at the inner diameter thereof, each of said fingers formed into a substantially U-shaped cross section with the "U" opening to the inner diameter of the ring, each of said fingers having axially spaced-apart top and bottom legs, said bottom leg integral with the said inner diameter of the segment through a bend portion, a circumferentially extending first beam connecting the said bottom legs of the said fingers of each segment, the first beam spaced from the rail ring, the said segments connected circumferentially to one another through second beams extending between and integral with adjacent top legs of adjacent segments.

4. The ring of claim 3 wherein the free ends of the said fingers remote from the said segments extend substantially axially beyond the second beams and contact the inner diameter of an unsegmented split rail ring positioned axially beyond the said top legs and radially outwardly from the axially extending free ends.

5. The ring of claim 4 wherein the beams connecting the top legs are radially wider than the beams connecting the bottom legs whereby the spring rates are equalized between the segmented rail ring and the unsegmented rail ring.

6. The ring of claim 5 wherein the axially extending free ends are angled from the axis of the ring to dish the unsegmented rail ring.

7. The ring of claim 3 wherein the axially outer surface of the segments is keystoned to reduce the thickness of a portion of the segment.

8. The ring of claim 7 wherein the keystoning reduces the thickness adjacent the inner diameter of the segment 9. The ring of claim 7 wherein the keystoning is adjacent the outer diameter to reduce the thickness of the segment adjacent the outer diameter.

10. An oil control piston ring comprising axially spaced-apart top and bottom circumferentially segmented rail rings, the segments of said rails circumferentially staggered with respect to one another, said segments axially interconnected by circumferentially spaced-apart spring fingers, the said fingers alternately connected to adjacent fingers by axially spaced-apart circumferentially extending beams spaced from the said rails, the axially spaced-apart beams staggered in their connection to adjacent fingers, the said fingers are formed into substantially U-shaped cross section, the "U" opening to the inner diameter of the ring, the "U" having top and bottom axially spaced-apart substantially radially directed legs, the inner diameters of the legs integral with the inner diameters of the rail segments through a hairpin bend, the said axially spaced-apart beams connecting adjacent fingers at the said leg portions whereby a first finger is integrally connected to an adjacent second finger through an integral beam connecting the axially top legs of the fingers and the said second finger is connected to an adjacent third finger through an integral beam connecting the bottom legs.

11. The ring of claim 10 wherein at least one of said rail rings has its axially outer face keystoned to reduce the thickness of portions thereof.

12. The ring of claim 11 wherein the keystoning is adjacent the inner diameter of the rail to reduce the thickness of the rail adjacent the inner diameter thereof.

13. The ring of claim 10 wherein the keystoning is adjacent the outer diameter of the rail to reduce the thickness of the rail adjacent the outer diameter.

* * * * *